W. DEATS.
COIL TAPING MACHINE.
APPLICATION FILED OCT. 1, 1907.

1,132,765.

Patented Mar. 23, 1915.
6 SHEETS—SHEET 1.

Witnesses.
Walter C. Strang
James D. Bethell

Inventor
William Deats
By Attorney
C. M. Nissen

W. DEATS.
COIL TAPING MACHINE.
APPLICATION FILED OCT. 1, 1907.

1,132,765.

Patented Mar. 23, 1915.
6 SHEETS—SHEET 2.

W. DEATS.
COIL TAPING MACHINE.
APPLICATION FILED OCT. 1, 1907.

1,132,765.

Patented Mar. 23, 1915.
6 SHEETS—SHEET 3.

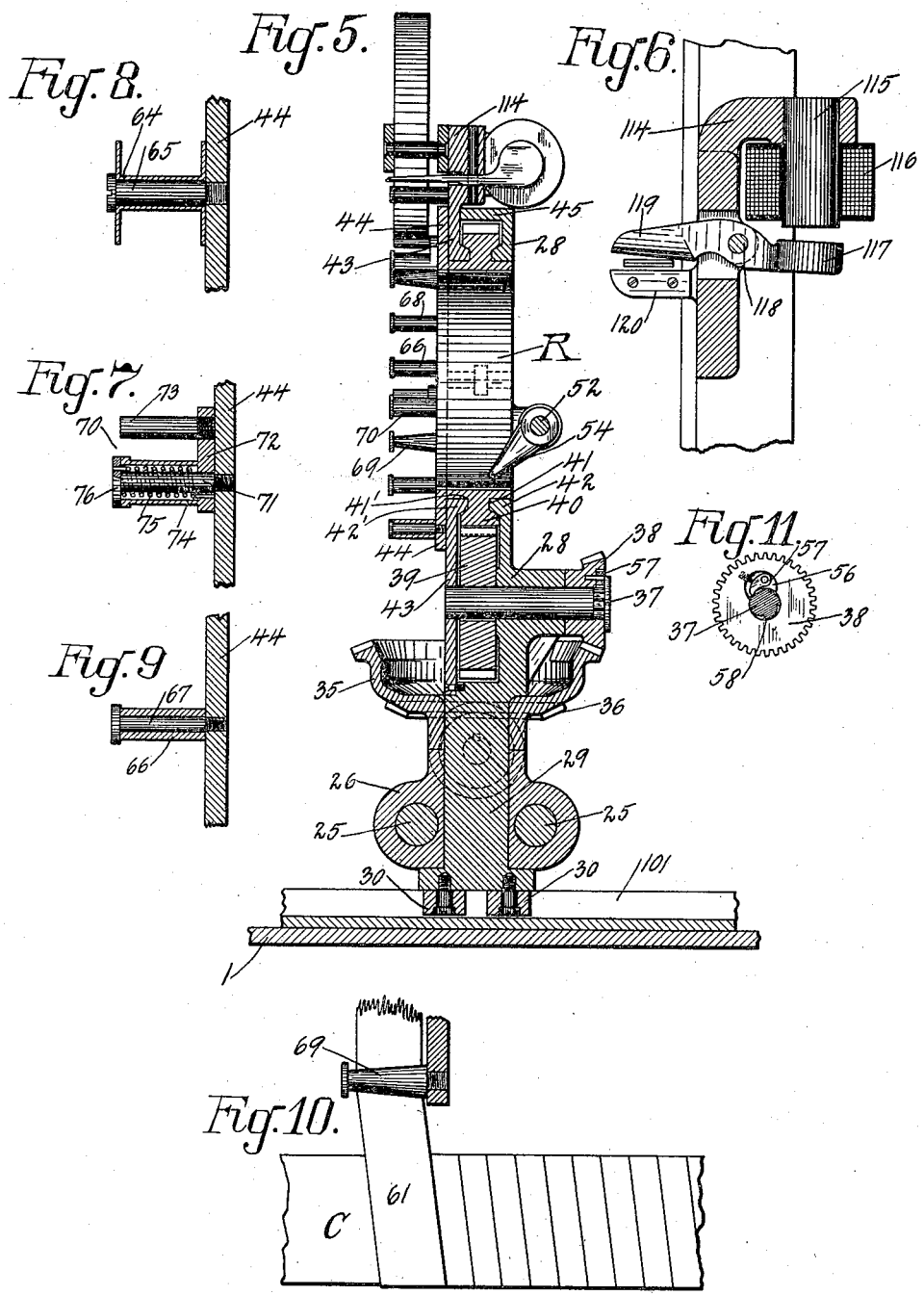

W. DEATS.
COIL TAPING MACHINE.
APPLICATION FILED OCT. 1, 1907.
1,132,765.
Patented Mar. 23, 1915.
6 SHEETS—SHEET 5.
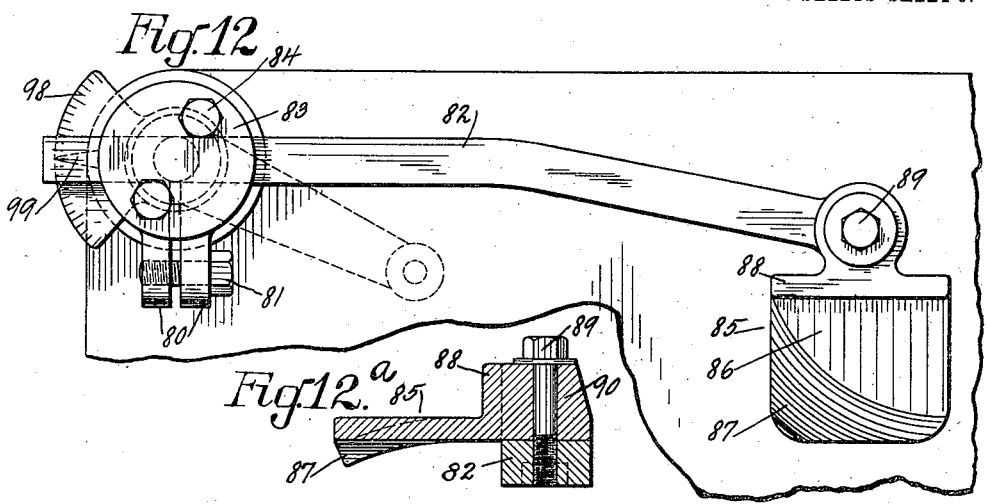
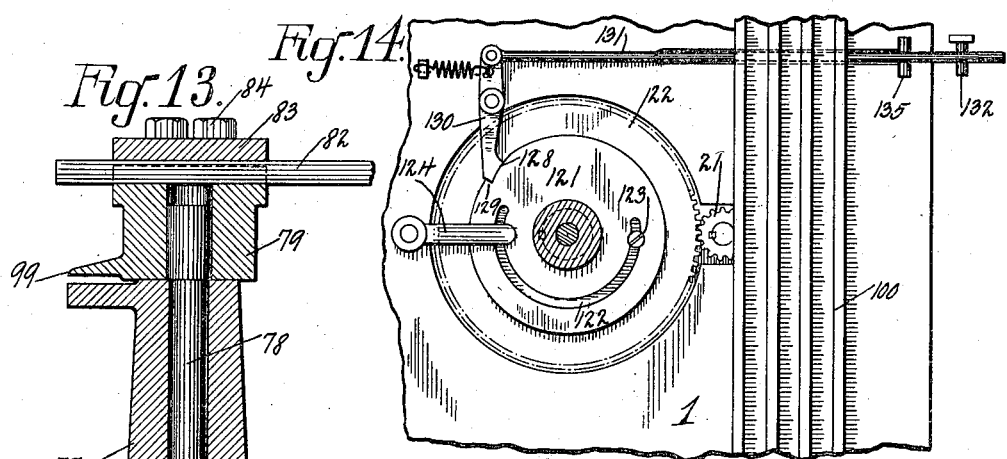
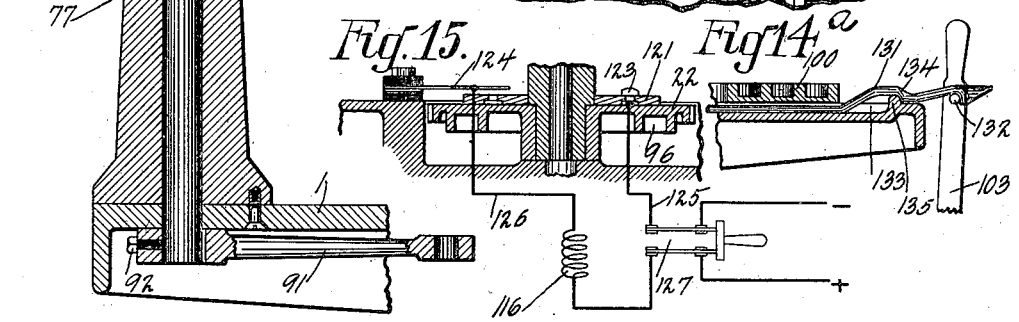

W. DEATS.
COIL TAPING MACHINE.
APPLICATION FILED OCT. 1, 1907.
1,132,765.
Patented Mar. 23, 1915.
6 SHEETS—SHEET 6.
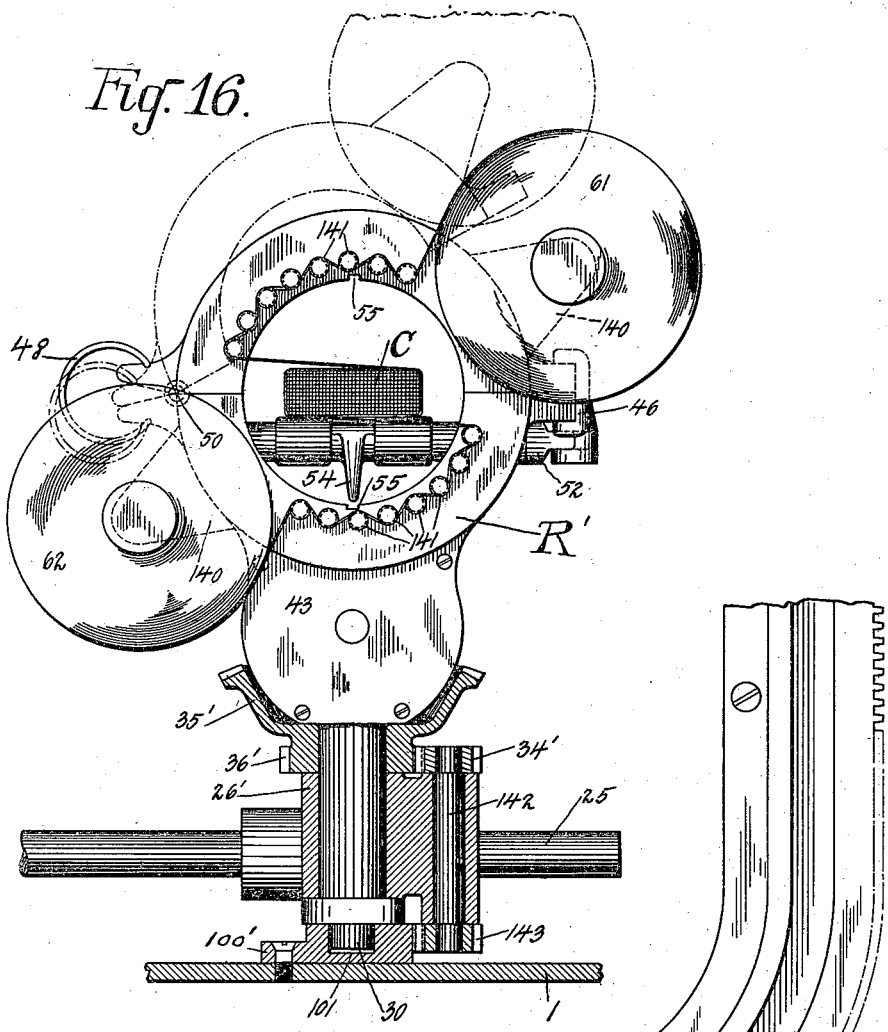
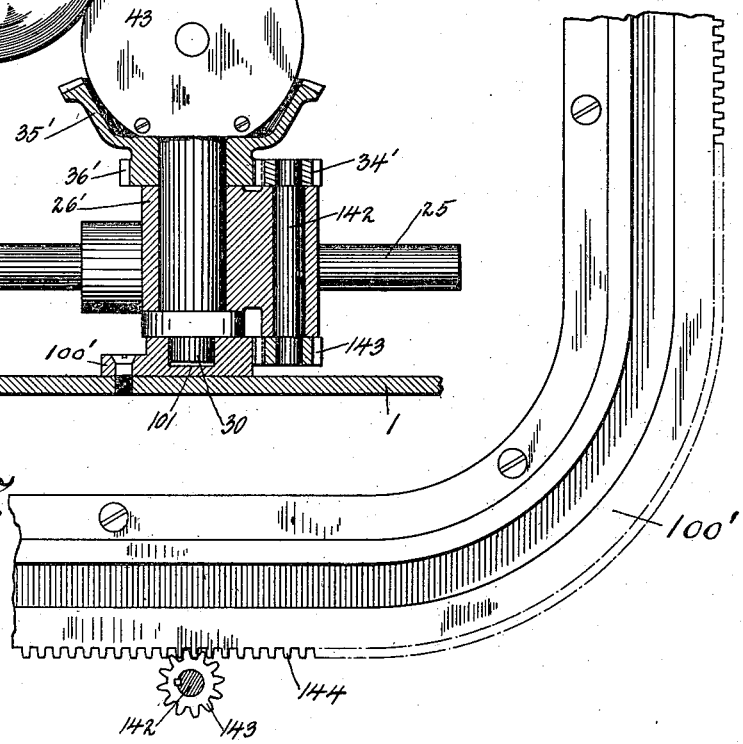

UNITED STATES PATENT OFFICE.

WILLIAM DEATS, OF YONKERS, NEW YORK.

COIL-TAPING MACHINE.

1,132,765.   Specification of Letters Patent.   Patented Mar. 23, 1915.

Application filed October 1, 1907. Serial No. 395,367.

*To all whom it may concern:*

Be it known that I, WILLIAM DEATS, a citizen of the United States, residing in Yonkers, in the county of Westchester and State of New York, have invented a new and useful Improvement in Coil-Taping Machines, of which the following is a specification.

My invention relates to winding machines, and in the forms disclosed is especially adapted for winding tape on coils of insulated wire. One of its objects is the provision of a machine in which the winding is done automatically.

Another object is to provide a machine adapted to wind tape or insulating material on coils of wire which are irregular or non-circular in cross-section.

A further object is the provision of means for automatically and evenly spacing the successive laps or coils of tape or winding, thus producing an evenly applied winding, and avoiding the waste of material and other objections incident to the irregular winding produced by methods of winding now in common use.

The invention also provides means for automatically cutting the tape when a sufficient amount has been drawn from the supply reels to complete the winding of a coil.

Other objects and the nature of the invention will appear more fully hereinafter.

Figure 1:
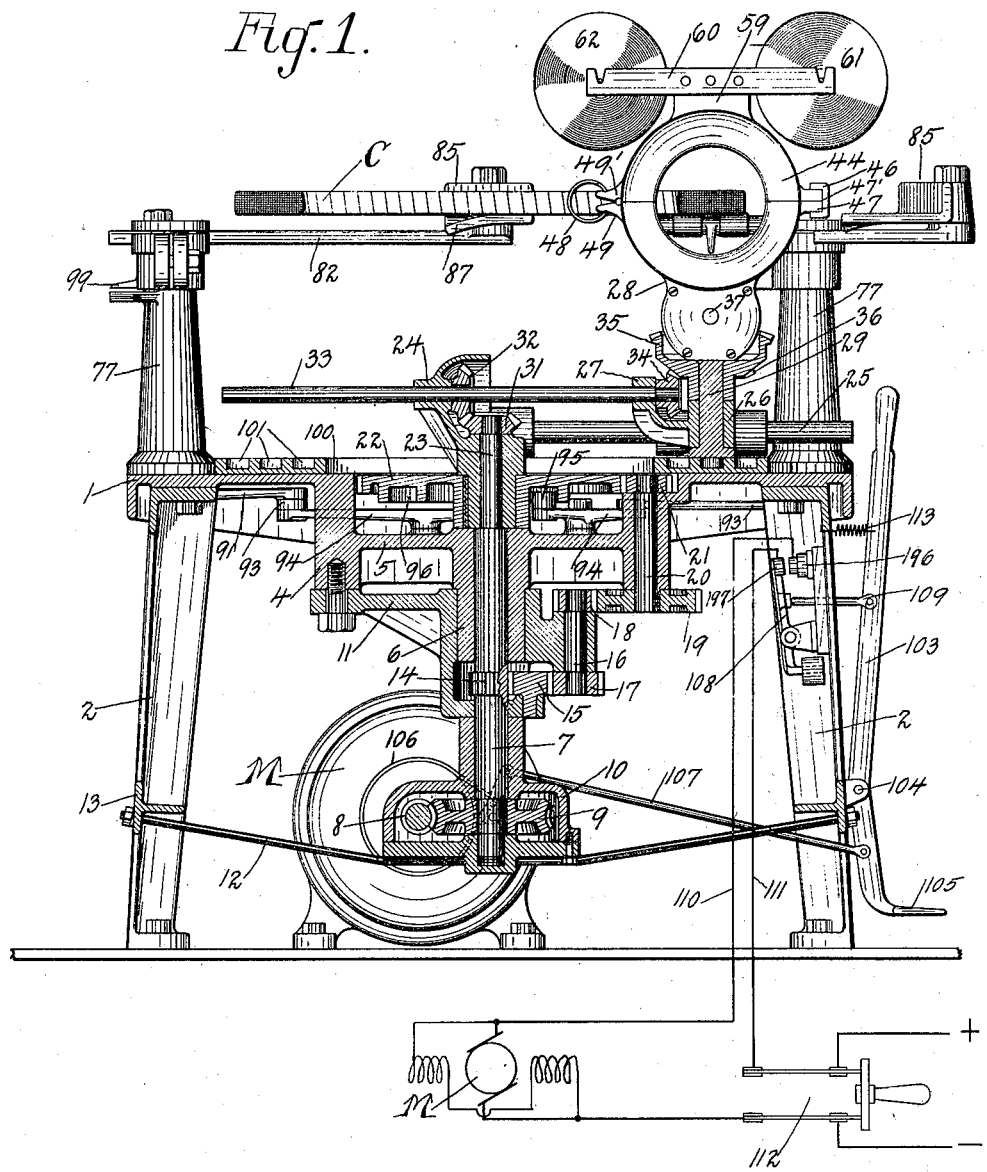
Figure 2:
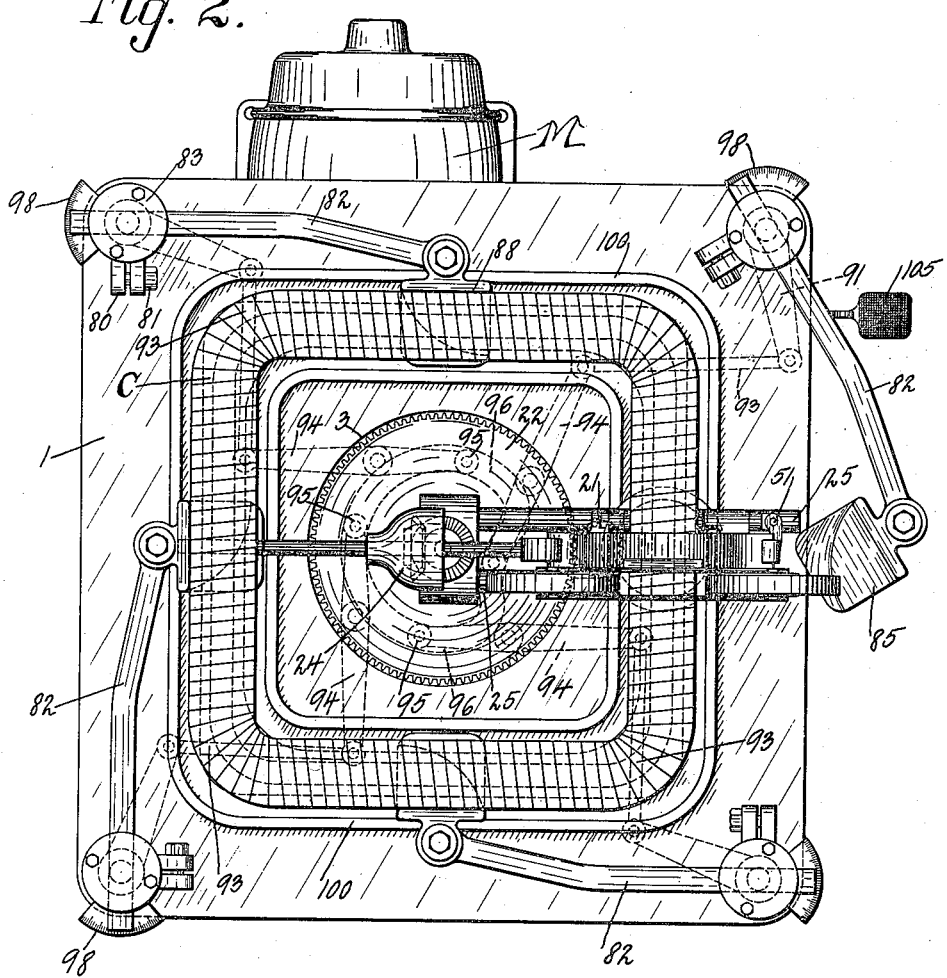
Figure 4:
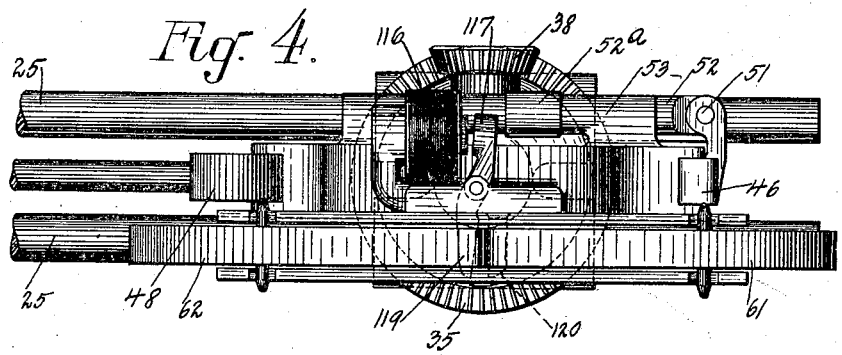
Figure 3:
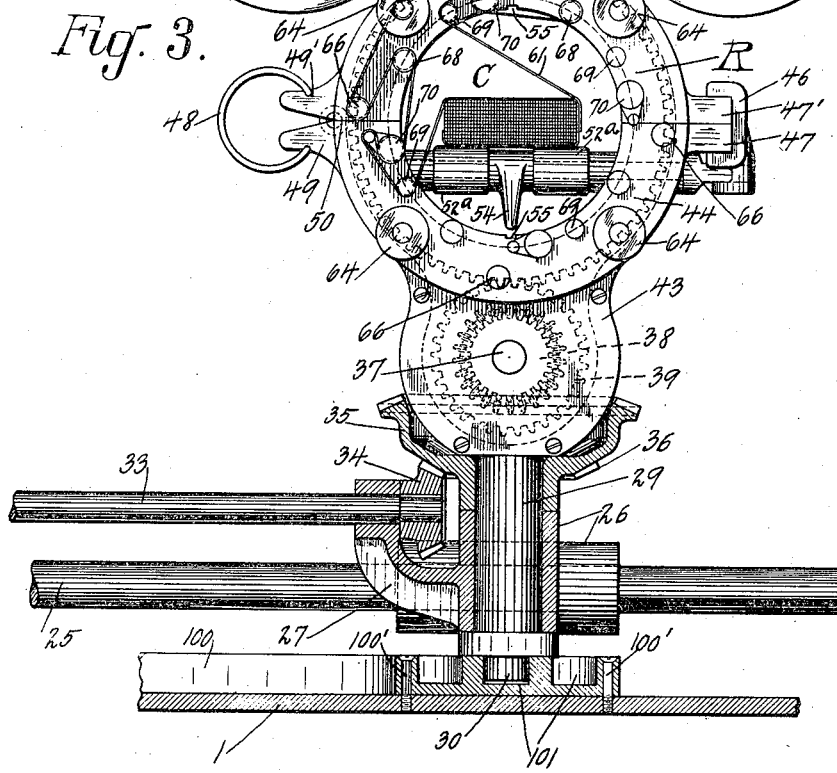

Referring to the drawings, Figure 1 is a sectional elevation of the tape winding machine and a motor connected thereto, showing also diagrammatically the motor and circuit to the controlling switch of the taping machine; Fig. 2 is a plan view of the taping machine; Fig. 3 is an elevation partly in section and on an enlarged scale, showing the winding ring and gearing therefor; Fig. 4 is a top plan view of the same; Fig. 5 is a sectional elevation of the same; Fig. 6 is a sectional plan view of an electro-magnet and cutter for the winding tape; Fig. 7 is a detail view of a tension and take-up device used on the winding ring; Figs. 8, 9 and 10 are details of tape guides used on the winding ring; Fig. 11 is a detail view of a pawl and ratchet connection permitting the winding ring to be operated in a forward direction independently of the power device; Figs. 12 and 12$^a$ show in plan and sectional elevation a supporting member for the coil; Fig. 13 shows a rock-shaft carrying the supporting arm shown in Fig. 12; Fig. 14 is a detail plan view showing means for automatically closing the circuit of the cutter magnet; Fig. 14$^a$ is a view of the engagement of a rod and the controlling lever; Fig. 15 is a sectional elevation of mechanism shown in Fig. 14; Fig. 16 is a view similar to Fig. 3 of another form of the winding ring and its gearing; and Fig. 17 is a plan view of parts shown in Fig. 16.

Like reference characters indicate corresponding parts throughout the drawings.

The framework of the machine comprises a table or platform 1, substantially square, supported in a horizontal position on legs 2 which may be bolted to the floor. The platform 1 which is preferably made of iron, has a central circular opening or depression 3 surrounded by a downwardly extending flange or projection 4 and a web 5 integral with the platform 1. The web 5 has a central hub or extension 6 integral therewith, and in which is journaled a vertical shaft 7. The shaft 7 operates two trains of gearing, presently to be described, one of which rotates the winding ring to wind the tape, and the other of which feeds the winding ring and associated parts bodily forward in a horizontal path as the tape is wound on the coil.

Power is supplied by an electric motor M or any other suitable source of power. The motor shaft is here shown as provided with a worm 8, geared to a worm wheel 9, keyed to the shaft 7. The casing 10 for the worm gearing is securely held up in position against a bracket 11 by brace-rods 12 bolted to horizontal T-irons 13 forming part of the framework of the machine. The bracket 11 surrounds the extension 6 and is bolted to the flange 4, and forms with the extension 6 a housing for a gear 14 secured to the shaft 7, and a pinion 15 journaled in the bracket 11 and meshing with the gear 14. A shaft 16 journaled in the bracket 11 has a gear wheel 17 keyed to its lower end and in mesh with the pinion 15. A pinion 18 is keyed to the upper end of the shaft 16 and meshes with a gear wheel 19 keyed to a shaft 20 journaled in the flange 4. The upper end of the shaft 20 has keyed thereto a pinion 21 which meshes with gear teeth on the periphery of a cam disk 22. The upper end of the shaft 7 has a reduced portion 23, on which is journaled a bracket 24 keyed to the cam disk 22. It will thus be seen that the motor operates through the train of gearing just described to rotate the bracket 24 and parts carried thereby about the shaft 7 as an axis.

Secured to the bracket 24 are two parallel horizontal rods 25, on which is slidingly mounted a bracket 26 carrying a bracket arm 27. A carrier 28, in which is rotatably mounted the winding ring R, has a vertical spindle or shaft 29 formed integral therewith. This spindle 29 is journaled in the bracket 26. Secured to the lower end of the carrier 28 are two antifriction guide rollers 30 which operate in the guideways 101 hereinafter described.

Keyed to the upper end of the shaft 7 is a miter gear 31 meshing with a miter gear 32. The gear 32 is feathered on a shaft 33 to permit longitudinal movement of the shaft, but cause the shaft to rotate with the gear 32. The shaft 33 is journaled near one end in the bracket arm 27, and keyed to said end of the shaft is a bevel pinion 34 which bears against the bracket arm 27. Journaled on the spindle 29 above the bracket 26 is a cup-shaped gear wheel 35, having on its under side bevel gear teeth 36 meshing with the pinion 34. Journaled in the carrier 28 is a horizontal shaft 37, on which is mounted a bevel pinion 38 (Figs. 3 and 5) in mesh with the bevel gear teeth on the upper edge of the gear wheel 35. The shaft 37 has keyed thereto a spur gear 39 which drives the winding ring R. The winding ring and its carrier 28 are each made in two separable parts to provide for placing the coil C within the winding ring. The horizontal diameter of the winding ring forms the line of separation between the parts. The gear teeth for the winding ring are formed on a peripheral flange 40 (Fig. 5) which has on opposite sides annular recesses 41, 41' which form guides or bearing surfaces for the ring as it rotates. The carrier 28 has an annular flange 42 which fits in the recess 41. A front plate 43 secured to the carrier 28 forms a covering for the gear 39, and is also provided with an annular flange 42' fitting in the recess 41'. The winding ring R is provided with an integral annular flange 44 which forms the front face of the ring and provides a suitable base to which the guide rolls for the winding tape may be secured. The carrier 28 has a flange portion 45 which forms a covering or casing for the gear teeth on the winding ring, and which also extends downward around the gear 39. It will be seen that the gear wheel 39 and the gear teeth on the winding ring are completely inclosed, protecting them from dust and dirt, and also protecting the operator from the dangers and annoyance of exposed gearing. As before stated, the winding ring and its carrying frame are each made in separable parts. These are held together on one side by a clamp 46 (Fig. 3) engaging the lugs 47, 47' formed on the fixed and movable members, respectively, of the carrier 28. At the opposite side of the winding ring, the parts are held together by a clamping ring or clip 48 made of spring steel or other suitable material. The ends of this clip engage in notches or grooves formed in the lugs or noses 49, 49' formed on the fixed and movable members, respectively, of the carrier frame. A stud or pin 50 forms a pivot about which the upper member of the carrier frame may be moved. The inner surfaces of lugs 49, 49' diverge outwardly from the center of this pivot, which permits the upper half of the carrier frame to be swung about said pivot into the position shown in dotted lines in Fig. 16. This brings the notches for the clip 48 closer together, permitting the ready removal or attachment of the clip. When the carrier frame is brought back to the full line position the ends of the clip are sprung apart sufficiently to put a powerful tension on the clip and thus hold the frame in place after the clamp 46 has also been applied. The clip 48 also applies a pressure on the lug 49' which tends to swing the upper member of the winding ring and carrier about the pivot 50. The weight of the movable parts is thus partly counterbalanced so that they may be lifted with ease, and the clip 48 may be made strong enough if desired to hold the parts in an open position. The clamp 46 is pivoted at 51 (Fig. 4) to a horizontal rockshaft 52 journaled in bearings 53, secured to or formed on the stationary part of the winding ring frame. On the rock-shaft 52 are loosely mounted two rollers 52ª which bear against the lower surface of the coil C, and form a support for the portion of the coil that is being wound. The rock-shaft 52 carries a nose or latch 54 inclined downwardly from the shaft, and having its end near the inner periphery of the winding ring R when the parts are in working position. The two members of the ring R are each provided with a groove 55 located midway between the two ends of the ring member, and in the path of movement of the end of the nose or latch 54 when the groove is in its lowest position. When the ring is assembled for operation the latch 54 is held out of engagement therewith, permitting free rotation of the ring, but when the clamp 46 is released, it will permit the rock-shaft 52 to swing the latch 54 downward into contact with the ring, and when either section of the ring reaches its lowest position the latch will engage a groove 55 and hold the parts securely in place.

In Figs. 5 and 11 is shown a pawl and ratchet device which permits a forward rotation of the winding ring independent of the motor and also independent of the movement of the ring bodily forward, for a purpose hereinafter explained. The pinion 38 has a recess 56 in which is pivoted a spring-pressed pawl 57 engaging ratchet teeth 58 on the shaft 37. When the pinion is rotated in a forward or counter-clockwise direction (Fig. 11) by the gear 35, the shaft 37 is carried with it, driving the gear 39 and winding ring R, but permitting the shaft 37 to rotate while the pinion 38 remains stationary.

The upper part of the carrier 28 is provided with a projecting member 59 (Fig. 3) to which is secured a horizontal bar 60 carrying reels of insulating tape 61, 62. The tapes are fed from the reels between guide rolls 63, from which they extend downward to the winding ring R. Mounted on the winding ring plate 44 is a series of flanged guide rollers 64 (see Fig. 8) freely mounted for rotation on the spindles 65 near the outer edge of the ring R. Intermediate these rollers 64, and equally distant from the center of the winding ring, is another series of rolls 66 (Fig. 9) mounted on spindles 67. Another series of rolls 68 similar to the rolls 66 is mounted near the inner periphery of the winding ring. Intermediate the rolls 68 are frusto-conical guide rolls 69 (Fig. 10). These rolls are made conical in order to incline the tape in the proper direction as it is wound spirally on the coil C. In the same circumference with the rolls 68 and 69 is a series of tension and take-up devices 70 (Fig. 7). Each of these tension and take-up devices comprises a stud or pin 71, secured to the winding ring plate 44, and an arm 72 pivoted thereto and carrying a guide pin 73. Integral with the arm 72 is a sleeve 74 surrounding the pin 71. Within this sleeve is a coil spring 75, secured at one end to the arm 72 and at the other end to a cap 76 on the pin 71. The spring 75 will normally hold the arm 72 substantially in the line of its travel with the winding ring, but will allow the arm to swing about the pin 71 under the tension of the winding tape, as hereinafter explained.

At each corner of the platform 1 is a corner post or standard 77. Each standard has a vertical rock-shaft 78 (Fig. 13) journaled therein and carrying at its upper end a head 79 which is in the form of an open ring or sleeve having parallel lugs 80 extending outwardly from its ends, and a clamping bolt 81 by which the head 79 may be firmly clamped in position on the rock-shaft. The head 79 is recessed to receive a horizontal arm 82 which is securely held in place by a cap 83 placed over the arm 82 and head 79, and clamped in place by bolts 84 tapped into the head 79. Each arm 82 carries at its outer end a holder or support 85 for the coil C. Each of these holders comprises a horizontal flat portion 86 on which the coil rests, a downwardly curved guiding portion 87 which permits the holder to automatically slide into position beneath the coil, and a vertical flange or stop 88 against which the outer edge of the coil C abuts. Each holder 85 is secured in position on its carrying arm 82 by a bolt 89. The bolt 89 passes through a boss 90 (Fig. 12ª) on the holder 85, and is screw-threaded to receive a nut seated in a squared recess in the arm 82. This forms a ready means for adjusting the holder 85 to any required angle on the arm 82, in order that the shoulder or stop 88 may abut squarely against the coil C. It is obvious that such adjustment will be necessary when the size of the coil C is changed so that the angle of the arms 82 is varied.

In operation the winding ring R which surrounds the coil C travels in a horizontal path around the coil, and the holders 85 would obviously interfere with this travel unless some means were provided for moving these holders out of the path of travel of the winding ring as it approaches the holders. This is provided for by the following means which automatically retract the holders successively as the winding ring approaches, and return them to holding position after the winding ring has passed. Each rock-shaft 78 has secured to its lower end beneath the platform 1 a horizontal rock-arm 91 by a set-screw 92. She rock-arms 91 are connected through links 93 to levers 94 pivoted intermediate their ends to the web 5. The inner ends of the levers 94 carry anti-friction guide rollers 95 which travel in a cam groove 96, formed in the under surface of the cam disk 22. The cam groove 96 for the greater portion of its extent is concentric with the cam disk, but the portion beneath the winding ring carrier is deflected inwardly, as shown in Fig. 2. This inwardly deflected portion is always beneath the winding ring carrier, as said carrier travels with the cam disk 22 when the machine is in operation. The levers 94 will each be held stationary as long as their respective guide rollers are in the concentric portion of the cam groove, thus holding each connected holder 85 in engagement with the coil C, but as the winding ring carrier approaches a holder 85, the inwardly deflected portion of the cam groove will move the lever 94 connected to said holder about its pivot, swinging the outer end of the lever 94 outward, and operating through the link 93, rock-arm 91, and rock-shaft 78 to swing the arm 82 and its holder 85 out of the path of the winding ring. As soon as the winding ring is past the holder 85 the inner end of the lever 94 swings outward to the concentric portion of the cam groove, swinging the holder 85 back to normal position. As the winding ring approaches the next holder it is automatically swung out to permit the winding ring to pass, and then swung back to holding position in the same manner as the preceding holder. In this way the holders 85 are successively operated to permit a complete winding of the coil C, but each holder 85 is returned to its holding position before the succeeding holder is moved, so that the coil C is at all times held on three sides by three of the holders, and the fourth side is supported by the rollers 52ª which are carried by the winding ring frame.

An indicator is provided in connection with each holder 85, and comprises a graduated scale 98 on an integral quadrant-shaped extension of the post 77, and a pointer 99 formed integral with the head 79. The position of the pointer on the scale indicates the position of the corresponding holder 85. These scales form a ready means for indicating when the holders are set at equal distances from the center so as to hold the coil C in a central position, and enable the operator to accurately set the holders before the coil is placed thereon. They also enable the operator to readily adjust the holders for any sized coil C that is to be wound, as the scale may be graduated with markings corresponding to the various sizes of coils which may be taped on the machine.

For the purpose of guiding the winding ring R in its horizontal travel around the coil C, I use a guide ring 100 which is substantially rectangular or any other suitable shape corresponding to the shape of the coil C that is to be taped. This guide ring is fastened to the patform 1 by screws 100' as shown in Fig. 3 with its sides equally distant from and parallel with the sides of the platform. In this position the coil C when centered in the holders 85 will be directly above the guide ring, as shown in Fig. 2. In the upper surface of the guide ring 100 are three parallel grooves 101. The guide rollers 30 on the lower end of the winding ring carrier 28 travel in one of these grooves and guide the winding ring in its horizontal travel around the coil C. This guide plate may be divided centrally to facilitate placing rollers 30 in any one of the grooves 101, or the substitution of other guide plates. The guide rollers 30 are shown in the middle groove which corresponds to the size of the coil C. If a coil a size larger or a size smaller is to be taped, the guide rollers 30 will be placed in the outer or inner guide groove, respectively. A greater or less number of grooves may be formed in the guide ring 100 if desired, and the ring may be made circular or elliptical, or of other shapes corresponding to the shape of the coil it is desired to tape. The guide ring may readily be removed and replaced by another of different size or shape. By using two guide rollers 30 in a line perpendicular to the plane of the winding ring R, said ring will always be held with its winding face in a plane substantially at right angles to the direction of the guide groove 101. This relative position of parts is slightly modified as the guide rollers pass through the bends at the corners of the guide ring, the turn of the winding ring being more gradual or in the arc of a larger circle than the bend in the guide groove. This may be counteracted by making the turns in the guide grooves 101 somewhat shorter than the bends at the corners of the coil C, but in practice a more gradual turn of the winding ring is desirable, in order to prevent the windings at the outer periphery of the coil C being unduly spread apart, and also to prevent the windings being bunched up too much at the inner corners of the coil. To further prevent the winding being unduly spread apart at the outer periphery of the coil, the gearing is so arranged that the angular movement of winding ring carrier 28 is in the reverse direction to the rotation of gear 35, so that gear 38 is accelerated in speed as it is revolved on gear 35, the required acceleration being obtained by making the gears 35 and 38 in proper proportion. The sliding connection between the bracket 26 and the rods 25 permits the necessary movement of the winding ring R toward and from the center of the machine, while the swivel connection between the bracket 26 and the winding ring carrier 28 permits the necessary angular movement of said ring with respect to the rods 25 to maintain the ring at right angles to its direction of movement.

Referring to Fig. 1, it will be seen that the motor M is started and stopped by means of the controlling lever 103. This lever is pivoted to the frame at 104 and has an arm extending below its pivot and provided with a foot-pedal 105. A brake band 106 for the motor is connected to the controlling lever by a rod 107. With the controlling lever in the position shown the brake is applied, but is released when the upper end of the lever is moved outward. A switch in the motor circuit is also controlled by the lever 103. This switch comprises a fixed contact 196 secured to the frame of the machine, and a weighted lever 108 pivoted to the frame and carrying at its upper end a contact 197. The switch lever 108 is connected by a link 109 to the controlling lever 103. As shown diagrammatically in Fig. 1, the wires 110, 111 in the circuit of the motor M are connected respectively with the contacts 196, 197. A main line switch 112 is also provided between the main line or source of current supply and the circuit of the motor M. When the controlling lever is operated, the brake is released and the movable contact 197 brought into engagement with the fixed contact 106, closing the circuit through the motor. The motor will then start and continue to run until the controlling lever is released, when the spring 113 will return the lever to its normal position, opening the motor circuit and applying the brake.

In order to cut the tape after a sufficient amount has been unwound from the reels 61, 62, I provide the electromagnetically operated cutter shown in detail in Figs. 4, 5 and 6. An iron bracket 114 which may be an integral extension of the upper member of the front plate 43 carries an iron core 115 for the solenoid or electro-magnetic winding 116. The armature 117 is pivoted on a pin 118 and is extended to form the movable blade 119 of the cutter, which coöperates with the fixed blade 120 secured to an extension of the bracket 114. The blades 119 and 120 extend forward in a horizontal plane, and the tapes 61, 62 pass between the blades to the winding ring. When sufficient tape has been unreeled to complete the winding of a coil C, the electro-magnet is energized and the armature 117 attracted to the magnet core, bringing the cutter blades together and severing the tapes.

In Figs. 14 and 15 is shown means for automatically closing the circuit of the electromagnet at the proper period in the operation of the machine. When the automatic cutter is used on the machine, a disk 121 is secured to the upper face of the cam disk 22 by friction. The disk 121 is provided with an arc-shaped slot 122 of somewhat more than a semi-circumference, in which is secured a contact 123 which may be adjusted to any position in the slot. A contact arm 124 is secured to the platform 1, but is electrically insulated therefrom, and extends over the disk 121 into the path of movement of the contact 123. In Fig. 15 the circuit for the electro-magnet coil 116 is shown diagrammatically, the opposite terminals of the coil being electrically connected to the contacts 123 and 124 by the wires 125, 126, respectively. The switch 127 connects the electro-magnet circuit with any suitable source of power, as a battery of cells, or the circuit of the motor M. The periphery of the disk 121 is circular with the exception of a short portion 128 which extends spirally inward and forms a recess in which the end of a lever 130 seats, and a shoulder 129 which forms a stop for the lever. This lever 130 is pivoted intermediate its ends to the platform 1. A rod 131 is pivoted at its inner end to the lever 130 and extends outwardly beyond the edge of the platform 1 and has its outer end hooked over a pin 132 (Fig. 14a) on the controlling lever 103. The rod 131 passes between the platfrom 1 and the guide ring 100, the platform being provided with a recess 133 for the portion of the rod 131 beneath the guide ring 100. The rod 131 is bent near its outer end, the angle of which coming in contact with the lug 135 detaches rod 131 from the controlling lever.

The operation of the entire machine may be briefly described as follows: Assuming that the taping of a coil of wires C has been completed as shown in Fig. 2, and it is desired to replace it by another coil that is to be taped, the winding ring R is moved into position with one of the grooves 55 directly beneath the nose 54, in which position the line of separation between the two sections of the winding ring coincides with the line of separation between the two sections of the winding ring carrier. The clamp 46 is then released from the lugs 47, 47' and allowed to swing downward, carrying the nose 54 into the groove 55 and holding the lower section of the winding ring against movement. The upper section of the winding ring and its carrier may now be swung upward about the pivot 50, and the coil C lifted from the holders 85 and removed from the winding ring through the opening thus formed. A new coil C is now inserted in place of the one just removed, and the sections of the winding ring and its carrier clamped in position. The tapes 61 and 62 which have been previously severed by the cutters 119, 120 are drawn downward by hand and threaded onto the guide rollers and tension devices as shown in Fig. 3. The tape 62 is first passed around the guide rollers 66, 68, the tension device 70 and the roller 69 and its end secured to the coil C. The winding ring R is then given a partial turn in a forward or counter-clockwise direction, bringing the next set of guide rollers into a convenient position to have the tape 61 threaded thereon and connected to the coil. The pawl and ratchet connection shown in Fig. 11 permits this rotation of the winding ring independently of the motor. Although two tapes are shown as being used, a single tape may be employed if desired, or more than two tapes may be used where desirable. The winding ring which is provided with four sets of guide rollers, and which thus provides for four tapes, might be constructed to accommodate any other desired number of tapes.

When the ends of the tapes have been secured to the coil C, and the clamp 46 adjusted, the controlling lever 103 is operated to release the motor brake and close the circuit, which will cause the motor M to start. The motor drives the shaft 7 which operates the train of gearing and shafting 31, 32, 33, 34, 35, 38, 37, 39 to rotate the winding ring R. The shaft 7 also drives the train of gearing 14, 15, 17, 16, 18, 19, 20, 21 and 22, the disk 22 carrying with it the bracket 24 and the rods 25, which in turn carry the winding ring R and associated parts bodily forward. The gears in this last train are proportioned to reduce the speed so that the winding ring R is fed forward at the proper rate of speed with respect to its rotation about its axis.

As the winding ring revolves about the coil C, the tapes will be fed through the guide rolls at variable speeds, owing to the coil C being non-circular or rectangular in cross-section. This would have a tendency to place a very irregular tension on the tapes and might at times admit of slack in the tapes. The tension and take-up device 70 provides a means for keeping the winding tape under a substantially uniform tension as it is being wound on the coil, and taking up any slack that might occur. If as the tape is being drawn through the guide rollers the tension increases, the arm 72 of the tension device will swing about its pivot, thus decreasing the arc of contact between the tape as well as between the tape and sleeve 74. It is manifest that as the arm 72 under spring tension swings about its pivot it carries the tape with it, thus bringing the tape running in reverse direction in contact. Any variation from the tension for which the device is set will shorten or lengthen this arc of contact, thus keeping the tension practically constant. This is a matter of great importance, as the friction of the tape running in the guide rollers is greater when they are full of tape than when nearly empty. This variation, the tension device neutralizes as well as that due to the rectangular coil.

It will be noted that as the winding ring R revolves, the tapes are unwound from the reels much faster than they are taken up by the coil C. This would not be true if the tape reels were carried around with the winding ring, but with the reels stationary as in Fig. 3 the tape is wound on the guide rollers 64 and 66 as the winding ring revolves. In other words, for a complete revolution of the winding ring, enough tape is fed from the reels to make one turn on the coil C and also extend entirely around the winding ring as guided on the rollers 64 and 66. It follows that when a coil is being wound, enough tape will be reeled off before the coil is half wound to complete the winding, the surplus tape being wound on the rollers 64, 66. The tape is cut, however, when the coil is only partly wound, by the automatic cutter which operates when a sufficient amount of tape has been unreeled to complete the winding of the coil. This cutter operates as follows: Before the motor M is started the parts are in the position shown in Figs. 14 and 15. When the controller lever 103 is operated to close the motor circuit, the lever 130 is moved out of the recess 128, allowing the disk 121 to rotate with the cam disk 22 upon which it is held by friction. The disk 22 makes one complete rotation while the coil is being wound. As the disk rotates the contact 123 is carried around until it comes under the contact 124, closing the circuit through the coil 116, and operating the cutter to sever the tapes. The contact 123 rides out from under the arm 124, continuing its travel till it has made a complete revolution with the disk 22 and reaches its starting position where it is stopped by the lever 130, while the disk 22 may travel any necessary amount to overlap the beginning and ending of tape. By this time the winding ring has been fed forward entirely around the coil and completed the winding, and the tape which was stored on the winding ring during the first part of the winding has all been fed to the coil C, leaving the winding ring empty ready for another coil.

Referring again to Fig. 14, it will be seen that when the controlling lever is operated setting the disk 121 in motion, the further movement of the lever will detach the rod 131 therefrom by the bent portion 131 acting against the projection 135, allowing the lever 130 to again come in contact with the periphery of disk 121, to stop it when it has returned to its starting position, regardless of the travel of the cam disk 22. When the machine is stopped the controlling lever again picks up rod 131 to remove the lever 130 from recess 128 when the machine is again started.

Figs. 16 and 17 illustrate a modification of the winding ring and the driving gearing therefor. The tape reels 61 and 62 are here shown as carried by arms 140 formed on the two sections of the winding ring R', so that the reels are carried around with the winding ring. The ring R' is provided with two sets of guide rolls 141, and the tapes are fed from the reels to these rolls, passing alternately above and below the successive rolls and from the rolls to the coil C. This form of construction dispenses with some of the guide rolls that are necessary when the tapes are wound on the winding ring as in the form shown in Fig. 3. The tension and take-up device 70 might be used with this modified construction if desired. The gear wheel 35' (Fig. 16) is driven by a pinion 34' meshing with the gear teeth 36' on said wheel. The pinion 34' is secured to a shaft 142 journaled in the bracket 26'. The lower end of the shaft 142 carries a pinion 143 which meshes with a rack or teeth 144 formed on the outer rim or periphery of the guide ring 100'. In operation the pinion 143 is rotated by the rack 144 as the bracket 26' is carried forward by the rods 25. The pinion 143 operates through the shaft 142 and pinion 34' to drive the gear wheel 35'. The train of gearing between the gear wheel 35' and the winding ring R' is identical with that shown in Fig. 3 between corresponding parts. In practice the form of gearing shown in Figs. 16 and 17 is not necessarily associated with the form of winding ring here shown. Obviously the rack and pinion gearing may be used with the form of winding ring shown in Fig. 3, or the gearing shown in Fig. 1 might be used with the winding ring of Fig. 16.

The taping machine is entirely automatic in its operation after a coil has been placed in position and the winding started. The tape is applied under a uniform tension and evenly spaced on the coil, even when the coil is non-circular or irregular in cross-section, the winding being done much more uniformly and accurately than can be done by hand or with machines now in use, which are not entirely automatic.

The machine as shown and described is especially adapted for taping coils of wire used in the construction of dynamo electric machines and for various other purposes, but it is to be understood that the invention comprehends a much broader application of the principles of construction involved. For example, the machine may be used for winding a coil C with some other material than the tape shown, as a cord, or a wire, or applying an additional winding of some other material to the taping. The machine might also be adapted, with slight changes by those skilled in the art, to wind an iron core with a coil or coils of insulated copper wire. The principles of my invention may be applied in various other ways; therefore, although I have shown a practical embodiment of my invention, I do not wish to be limited to the exact forms of construction disclosed, as various changes in the details of construction and arrangements of parts might be made by those skilled in the art without departing from the spirit of the invention or its scope as defined by the appended claims.

What I claim as new and desire to secure by Letters Patent of the United States is:—

1. In a winding machine, the combination with a winding ring composed of separable sections, of a carrying frame surrounding the winding ring and holding the sections of the winding ring together, said carrying frame being also composed of separable sections, a clamp for connecting together the sections of the frame, and a latch device controlled by the clamp and operated upon the release of said clamp to hold the sections of the ring symmetrical with the sections of the frame.

2. In a winding machine, the combination with a winding ring, of an annular carrying frame for guiding and holding the said ring, said ring and frame both being composed of sections separable at a plane passing through the axis of the ring, clamping mechanism for holding the sections of the frame together and the ring closed, and a latch device operated upon the release of said clamp to hold the sections of the ring symmetrical with the sections of the frame and permit the insertion of an article to be wound.

3. In a winding machine, the combination with a winding ring, of an annular frame surrounding the ring and forming a guiding and holding means therefor, said ring and frame being composed of pivoted sections, mechanism tending to open the frame and ring, and a clamp to hold the ring and frame normally closed.

4. In a winding machine, the combination with a sectional winding ring or bobbin, of a sectional carrying frame forming a guide for said ring, a spring hinge for the sections of the frame, and a device for holding the sections of said frame normally together in closed position against the action of said spring hinge.

5. In a winding machine, the combination with a winding ring, of an annular frame surrounding the ring, said ring and frame each being composed of separate sections divided equally, a spring tending to separate the sections at a predetermined point, a clamping device for holding said sections normally together in closed position, and an extension from said clamping device coacting with a notch in said ring to hold the sections of the latter in a symmetrical position with respect to the sections of the frame to permit the insertion of an article to be wound inside of said ring.

6. In a winding machine, the combination with a winding ring and an annular frame surrounding the same, each being composed of separable sections, of mechanism for rotating the ring in the frame, a rock-shaft, a clamp carried by the rock-shaft and movable into position to clamp the sections of the frame together, and means carried by the rock-shaft and movable into position to clamp a section of the ring and a section of the frame against relative movement when the clamp is released, but held in inoperative position when the clamp is applied.

7. In a winding machine, the combination with a winding ring divided diametrically into two equal and separable sections, of an annular frame surrounding the ring and also divided diametrically into two equal and separable sections, apparatus for rotating the ring in the frame, a rock-shaft mounted on one of the frame sections, a clamp carried by said rock-shaft and movable into position to clamp the frame sections together, and a nose or projection from the rock-shaft movable into engagement with a notch in the ring when the clamp is released to hold the sections of the ring with their divisions coinciding with the divisions of the frame.

8. In a winding machine, the combination of a winding ring, and a guide roller carried by the ring on an axis parallel to the axis of the ring and having its guiding surface inclined to the axis of the roller.

9. In a winding machine, the combination of a winding ring, and frusto-conical and cylindrical guide rollers carried by the ring and each having its axis parallel to that of the axis of the ring.

10. A winding machine having a horizontally disposed guide ring for a coil to be taped provided with a groove on its upper surface and gear teeth on its periphery, and means actuated by the guide ring and coöperating therewith for winding a coil.

11. A winding machine having a horizontal guide ring for a coil to be taped formed with gear teeth on its periphery, and a guide groove in its face parallel with the gear teeth, coil winding mechanism guided by said groove, and gearing connecting said gear teeth with the winding mechanism.

12. In a winding machine, the combination with a rotatable member, of a rod carried thereby and extending radially therefrom, a carrier slidably mounted on the rod, a winding ring carried by said carrier, mechanism to rotate said member, and means for guiding the carrier in a non-circular path as it is carried forward by the rod.

13. In a winding machine, the combination with a member rotatable about a vertical axis, of a horizontal rod extending therefrom, a bracket slidably mounted on the rod, a carrier having a swivel connection with the bracket, a winding ring carried by the carrier, and means for holding the winding ring perpendicular to its direction of travel and guiding the carrier and ring in a non-circular path as they are carried forward by the rod.

14. In a winding machine, the combination with a winding ring, of a carrier therefor bodily movable about a fixed axis and swiveled relatively thereto, a drive shaft, a train of gears between the shaft and carrier, and a second train of gears between the shaft and winding ring.

15. In a winding machine, the combination with a plurality of holders in position to support an article to be wound, of means for successively operating the holders to move each holder out of holding position and return it to holding position before the succeeding holder is moved.

16. In a winding machine, the combination with means for applying a winding to an article to be wound, and means for producing a relative movement between said first-named means and the article to be wound, of a holder in position to support said article, and means for moving said holder out of holding position during the winding of the portion engaged by the holder and automatically returning the same.

17. In a winding machine, the combination with means for applying a winding to an article to be wound, of a plurality of holders in position to support said article, means for feeding said first-named means forward in the process of winding, and means for successively retracting the holders and automatically returning the same.

18. In a winding machine, the combination with means for applying a winding to an article to be wound, of a plurality of holders in position to support said article, means for feeding said first-named means forward in the process of winding, and automatic means for successively retracting the holders and returning them to holding positions.

19. In a winding machine, the combination with a plurality of holders in position to support a closed ring or coil, and a winding ring in position to interlock with the ring or coil, of means for feeding the winding ring along the coil, and automatic means for successively retracting the holders as the winding ring approaches and returning each holder to holding position before the succeeding holder is retracted.

20. In a winding machine, the combination with a plurality of holders, of means for supporting them in a horizontal plane, and means for successively retracting them in a horizontal direction and returning them to position.

21. In a winding machine, the combination with a plurality of vertical rock-shafts, horizontal arms carried by the shafts, holders on the ends of the arms in position to hold an article to be wound, and means for successively rocking the shafts in a direction to move the holders out of holding position, and then in the opposite direction to return the holders to holding position.

22. In a winding machine, the combination with a winding ring, of a plurality of horizontal arms, holders on the arms in position to support a ring or coil interlinked with the winding ring, means for feeding the winding ring forward along the coil, and means for swinging each arm and its holder out of the path of the winding ring as it approaches, and returning the holder to supporting position after the winding ring has passed.

23. In a winding machine, the combination with a plurality of holders in position to support a closed ring or coil, of means for applying a winding to the entire ring or coil, and cam operated means for retracting each holder during the winding of the portion of the ring or coil engaged by said holder, and returning the holder to holding position.

24. In a winding machine, the combination with a cam disk, of means for rotating the disk, a winding ring connected for movement with the disk, a plurality of rock shafts, arms on the shafts, holders carried by the arms and normally held in position to support a ring or coil interlinked with the winding ring, means for guiding the winding ring along the coil, and connections between the rock shafts and the cam disk.

25. As an article of manufacture, a holder formed with a horizontal supporting surface, a downwardly inclined lip or flange on one side and a vertical shoulder or flange on the opposite side.

26. In a tape winding machine, the combination of an automatically actuated holder for a wound coil, and an indicator associated therewith to indicate the position of the holder.

27. In a winding machine, the combination with pivoted arms, of holders carried by the arms, means for securing the arms and holders in adjusted positions, and indicators associated with and indicating the position of said holders.

28. In a winding machine, the combination with means for applying a winding to an article to be wound, of holding devices for the article, a winding carrier, and a plurality of shafts associated with said holding devices actuated alternately to move the said holders out of the path of the winding carrier.

29. In a winding machine, the combination with means for applying a winding to an article to be wound, of holding devices for the article, a winding carrier, a plurality of shafts, arms connecting said shafts and holders actuated alternately to move the said holders out of the path of the winding carrier, and means for varying the length of said arms.

30. The combination of a number of rock shafts and holder arms, the latter connected to the shafts by swivels, of holders carried by the arms and connected thereto by swivels, a scale on the support for the rock shafts, and a pointer on the arms to indicate any predetermined position for the arms.

31. In a winding machine, the combination with a winding ring, of means for simultaneously storing winding material on the winding ring and feeding it from the ring to the article to be wound, and means for automatically severing the material at a predetermined period in the operation of the machine.

32. In a winding machine, the combination with means for winding a ring or coil, of a source of supply of winding material, means for drawing the winding material from the source of supply faster than it is wound on the ring or coil, and means for automatically severing the material when enough has been drawn from the source of supply to complete the winding of the ring or coil.

33. In a winding machine, the combination with means for taping a coil of wire, of an electro-magnet, a cutter connected thereto, and automatic means for operating the electro-magnet.

34. In a winding machine, the combination with means for applying a winding to a ring or coil, of an electro-magnet, a cutter connected thereto, a normally open circuit for the electro-magnet, and means for automatically closing the circuit at a predetermined period in the operation of the machine.

35. In a winding machine, the combination with means for winding a ring or coil, of an electro-magnet, a cutter connected thereto, a normally open circuit for the electro-magnet, means for automatically closing the circuit at a predetermined period in the operation of the machine, and means for adjusting said closing means to vary the time of closing the circuit.

36. In a winding machine, the combination with means for tapering a ring or coil, of a cutter, an electro-magnet operatively connected to the cutter, a rotatable disk, a contact carried thereby, a fixed contact in the path of movement of said first-named contact, and a circuit for the electro-magnet normally open between the contacts.

37. In a winding machine, the combination with means for winding a ring or coil, of a cutter, an electro-magnet operatively connected to the cutter, a disk, means for giving the disk a single complete rotation during the winding of a coil, an arc-shaped slot in the disk, a contact adjustably mounted in the slot, a fixed contact extending into the path of the adjustable contact, and a circuit for the electro-magnet normally open between said contacts.

38. In a winding machine, the combination with a winding ring having gear teeth on its periphery, of means coöperating therewith for giving it a simultaneous rotary and bodily forward movement, and means for permitting a rotary movement of the ring independent of its bodily forward movement.

39. In a winding machine, the combination with a carrier, of a winding ring rotatably mounted therein having gear teeth on its periphery, means for simultaneously moving the carrier forward and rotating the ring, and means permitting the rotation of the ring independently of the forward movement of the carrier.

In testimony whereof, I have signed my name to this specification in the presence of two subscribing witnesses.

WILLIAM DEATS.

Witnesses:
CHAS. M. NISSEN,
DAVID LARSON.